Oct. 26, 1965  H. BOLDT ETAL  3,214,131

VALVE WITH SPHERICAL PLUG

Filed May 22, 1962  2 Sheets-Sheet 1

INVENTORS:
Heinz Boldt
Erich Stürmer
BY

United States Patent Office

3,214,131
Patented Oct. 26, 1965

3,214,131
VALVE WITH SPHERICAL PLUG
Heinz Boldt, Berlin-Charlottenburg, and Erich Stürmer, Berlin-Reinickendorf, Germany, assignors to Borsig Aktiengesellschaft, Berlin - Tegel, and Werner Hartmann, Ehlershausen uber Lehrte, Germany
Filed May 22, 1962, Ser. No. 196,816
Claims priority, application Germany, May 25, 1961,
B 62,634
1 Claim. (Cl. 251—170)

The present invention relates to a cock or valve with a spherical plug or stop which by means of two bearing studs is journalled in an undivided valve housing while the seal of the flow passage in the housing with regard to the plug is effected by sealing rings which are displaceable in the direction of the flow passage, the plug being inserted in a cylindrical bore in the housing which bore extends in the direction of the axis of the plug.

According to a heretofore developed cock or valve of the above mentioned type, the guiding bushing operable to displace the sealing ring in the direction of the flow passage is adapted to be actuated in each of its two directions of movement by special actuating means of which that one which moves the guiding bushing from its sealing position back into the housing of the valve is formed by cams which are mounted on the surface of the plug and during the rotation of the plug act upon the inner end faces of the guiding bushing and displace the latter. Two or more cams with increasing radial height may be arranged one behind the other.

According to one embodiment of this heretofore developed cock or valve, the actuating means moving the guiding bushing into its sealing position consists of an adjusting screw with conical tip which extends through the valve housing and which cooperates with a corresponding conical surface of the guiding bushing. This arrangement has the advantage that the actuating means for the guiding bushing to bring about the sealing effect is accessible from the outside.

It is an object of the present invention further to improve the arrangement as set forth above in order to make the adjusting means for the guiding bushing sturdier.

It is also an object of this invention to provide a cock or valve as set forth in the preceding paragraph, which is simple in construction and highly effective.

These and other objects and advantages of the invention will appear more clearly from the following specification in connection with the accompanying drawing, in which.

Figure 1:
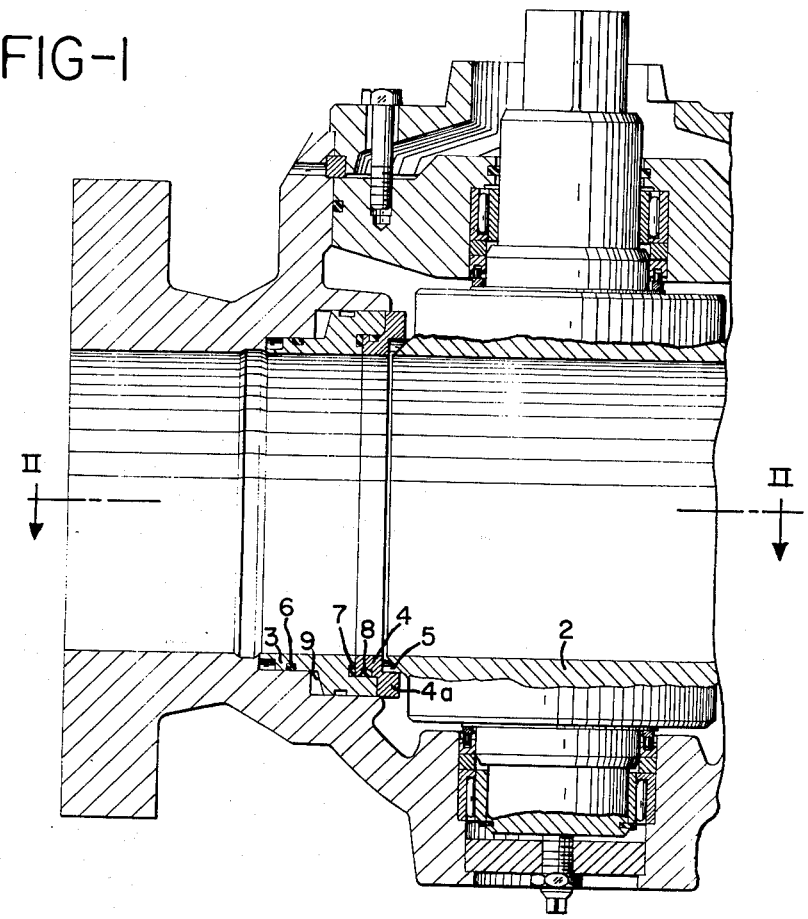
FIGURE 1 illustrates a vertical section through a valve according to the present invention while, in view of the symmetry between the right-hand and left-hand portions of the valve, the right-hand side is only partially shown.
Figure 2:
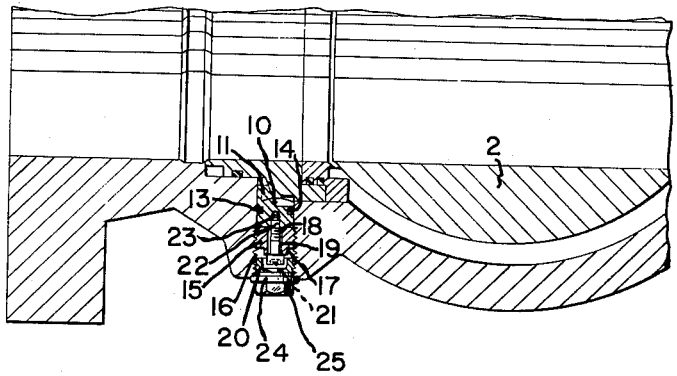
FIGURE 2 represents a section taken along the line II—II of FIGURE 1.
Figure 3:
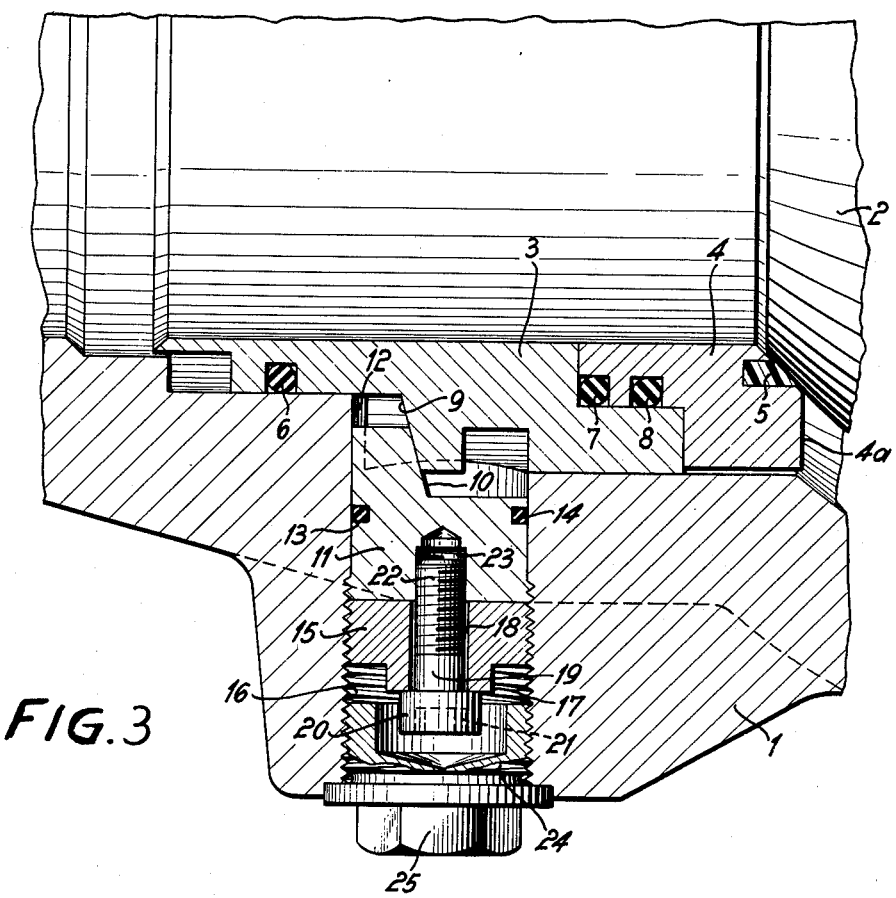
FIGURE 3 illustrates on a somewhat larger scale than FIGURES 1 and 2 a partial longitudinal section through the valve housing and the guiding bushing within the range of the adjusting means for moving the adjusting bushing to bring the sealing ring into its sealing position.

The valve according to the invention is characterized primarily in that the adjusting means for moving the guiding bushing into its sealing position comprises a wedge member guided in a cylindrical bore of the valve housing and provided with a wedge or inclined surface cooperating with a corresponding wedge or inclined surface of the guiding bushing, the axial displacement of the wedge member being brought about by an adjusting screw threadedly engaging a thread in the housing bore. Furthermore, the arrangement is provided with a withdrawal screw extending through said adjusting screw and having its thread in engagement with a correspondingly threaded bore of the wedge member.

Advantageously, the cylindrical portion of the wedge member is provided with an annular groove or the like for receiving a sealing O-ring. This brings about the further advantage that the adjustment of the guiding bushing may be effected also while the inner operating pressure of the valve is being maintained.

Specifically referring to the drawing, the ball-shaped plug 2 is rotatably journalled in the valve housing 1. As will be seen from the drawing, the guiding bushing 3 carries the supporting ring 4 for the sealing ring 5, said supporting ring 4 being displaceable together with the guiding bushing 3. When the guiding bushing is moved into its most inward position, i.e., into its right-hand position with regard to the drawing, ring 5 seals the passage in the housing with regard to plug 2. When for purposes of removing the spherical plug 2, the guiding bushing 3 together with supporting ring 4 and sealing ring 5 is to be moved toward the rear, i.e., toward the left with regard to the drawing, such displacement is effected by cams arranged on the surface of plug 2. It will be appreciated that by corresponding rotation of the plug, said cams press against the inner end face 4a and thus push the guiding bushing 3 toward the left until the passage of the plug is possible. The supporting ring 4 is provided with O-rings 7 and 8, whereas the guiding bushing 3 is provided with an O-ring 6.

Guiding bushing 3 has an inclined or wedge surface 9 for cooperation with a correspondingly inclined or wedge surface 10 of a wedge member 11. This wedge member 11 has its major portion cylindrically shaped and is displaceable in bore 12 of the valve housing 1. The cylindrical portion of the wedge member 11 has an annular groove 13 in which is mounted a sealing O-ring 14. In this way, it will be possible to effect desired adjustments of the wedge member 11 even when within valve housing 1 the operating pressure still prevails. The adjustment of the wedge member 11 is effected by an adjusting screw 15 the thread of which displaceably engages a thread 16 of bore 12 in housing 1 so that adjusting screw 15 is axially displaceable in said bore 12. In order to make possible the rotation of the adjusting screw 15, the latter is provided with surfaces 17 for receiving a socket wrench.

Adjusting screw 15 is provided with a bore 18 which has a diameter somewhat greater than the diameter of withdrawal screw 19. Screw 19 has a head 20 with an interior hexagonal bore 21 for receiving a corresponding wrench. The front portion of screw 19 is provided with a thread 22 threadedly engaging a threaded bore 23 of the wedge member 11. The arrangement furthermore comprises a closure cap 24 with a hexagonal head 25 by means of which cap 24 can be screwed into or out of thread 16.

If it is desired to move the guiding bushing 3 from the position shown in the drawing toward its left-hand position with regard to the drawing, first the closure cap 24 is unscrewed, and the withdrawal screw 19 is loosened somewhat whereupon the adjusting screw 15 is screwed in a direction away from the wedge member 1. In this way, the inclined or wedge surfaces 9, 10 will disengage each other. By rotating the ball-shaped plug 2, the cams connected thereto will act upon the end face 4a of ring 4 thereby moving the latter together with the parts 3 and 5 to 8 toward the left with regard to the drawing. This frees the plug 2 so that it can be withdrawn.

When plug 2 is again to be inserted, and a seal has again to be established between ring 5 and plug 2, first the adjusting screw 15 is screwed into thread 16 of the housing bore 12. As a result thereof, the inclined or wedge surfaces 9, 10 will again engage each other so that the guiding bushing 3 and at the same time the supporting ring 4 and sealing ring 5 will be displaced into sealing position, i.e. into the position shown in the drawing so that the sealing condition shown in the drawing will be re-established. Thereupon, the withdrawal screw 19 is screwed in again until the parts 11, 15 and 19 are arrested. Finally, the closure cap 24 is inserted again.

It is, of course, to be understood that the present invention is, by no means, limited to the particular construction shown in the drawing but also comprises any modifications within the scope of the appended claims. Thus, for instance, the means for turning the parts 15 and 19, namely the surfaces 17 for a socket wrench and the hexagonal bore 21, may, of course, also be replaced by other means.

Furthermore, if desired, also two or more inclined or wedge surfaces 9 may be distributed over the circumference of the guiding bushing 3 which wedge or inclined surfaces would then cooperate with corresponding wedge or inclined surfaces of a plurality of wedge members 11. This would safely prevent an edging or canting of the guiding bushing 3 when the latter is moved into its sealing position. The individual parts may be made of any suitable material. The arrangement according to the invention is characterized primarily by greater sturdiness inasmuch as the wedge member 11 provided with its inclined or wedge surface 10 is well supported along the rear wall of the housing.

What we claim is:

In combination in a valve: a housing having a passage therethrough for conveying a fluid and being provided with a first bore having its axis at an angle with regard to the axis of said passage, a rotatable plug extending through said first bore and having its ends provided with bearing studs rotatably journalled in said housing, supporting means mounted in said housing and displaceable in axial direction of said passage and provided with sealing ring means for sealing engagement with said plug to thereby seal said passage relative to said first bore, a second bore in the housing coaxial with the flow passage at the side of said first bore, bushing means axially displaceably mounted in said second bore substantial axial alignment with said supporting means supportingly engaging said supporting means and adjustable axially in said second bore to move said supporting means in the direction toward said plug to press said sealing ring means into sealing engagement with said plug, said bushing means being provided with annular surface means inclined with regard to the longitudinal axis of said bushing means, said housing being provided with a third bore substantially perpendicular to the axis of said bushing means and intersecting said second bore, said third bore having a first section thereof, said first section having a smooth bore, and a second section, the latter being threaded, a wedge member for a major portion of its length being cylindrically shaped and provided with an annular groove, an O-ring mounted in said groove, said wedge member, together with said O-ring being sealingly and slidably mounted in said first section and provided with inclined surface means of substantial area corresponding to and slidingly engaging a substantial area of said inclined surface means of said bushing means, said surfaces being inclined in a direction such that movement of the wedge member toward said bushing means will cause the latter to move said supporting means toward said plug for pressing said sealing ring means into sealing engagement with said plug, screw means threadedly engaging and displaceably mounted in said second section and abutting said wedge member and adjustable from the outside of said housing for adjusting said wedge member toward said bushing means, and bolt means freely passing from the outside of said screw means through the latter and threadedly engaging said wedge member for selectively moving the latter away from said bushing means upon adjustment of the screw means away from the wedge member, said bolt means upon being drawn up tight locking said screw means and wedge member together.

References Cited by the Examiner

UNITED STATES PATENTS

| | | | |
|---|---|---|---|
| 1,738,450 | 12/29 | Ryan et al. | 251—159 |
| 2,639,883 | 5/53 | Smith | 251—170 |
| 2,661,926 | 12/53 | Resek | 251—174 XR |
| 2,718,372 | 9/55 | Broz | 251—174 |
| 2,788,017 | 4/57 | Scherer | 251—170 XR |
| 2,883,146 | 4/59 | Knox | 251—315 XR |
| 3,033,227 | 5/62 | Goldman | 251—171 XR |
| 3,037,738 | 6/62 | Jackson et al. | 251—315 XR |
| 3,106,380 | 10/63 | Gerber | 251—362 |

FOREIGN PATENTS

| | | |
|---|---|---|
| 1,102,510 | 3/61 | Germany. |
| 24,254 | 1902 | Great Britain. |
| 813,059 | 5/59 | Great Britain. |

LAVERNE D. GEIGER, *Primary Examiner.*